US007873731B1

(12) United States Patent
Leavy et al.

(10) Patent No.: US 7,873,731 B1
(45) Date of Patent: Jan. 18, 2011

(54) USE OF PER-FLOW MONOTONICALLY DECREASING TTLS TO PREVENT IDS CIRCUMVENTION

(75) Inventors: Nicholas Leavy, Palo Alto, CA (US); Michael L. Hall, Jr., Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 2017 days.

(21) Appl. No.: 10/820,591

(22) Filed: Apr. 8, 2004

(51) Int. Cl.
G06F 15/173 (2006.01)
G06F 15/16 (2006.01)
(52) U.S. Cl. ............... 709/225; 709/230; 709/235
(58) Field of Classification Search ............... None
See application file for complete search history.

(56) References Cited

U.S. PATENT DOCUMENTS

| 6,192,404 | B1 * | 2/2001 | Hurst et al. ............ 709/224 |
| 6,671,737 | B1 * | 12/2003 | Snowdon et al. ......... 709/243 |
| 7,283,563 | B1 * | 10/2007 | Allan .................... 370/469 |
| 7,552,237 | B2 * | 6/2009 | Cernohous et al. ....... 709/245 |
| 2003/0009594 | A1 * | 1/2003 | McElligott ............ 709/245 |

OTHER PUBLICATIONS

Mark Handley et al, "Network Intrusion Detection: Evasion, Traffic Normalization, and End-to-End Protocol Semantics," Proceedings of USENIX Security Symposium 2001, www.icir.org/vern/papers/norm-usenix-sec-01.pdf.*

Thomas H. Ptacek and Timothy N. Newsham; *Insertion, Evasion, and Denial of Service: Eluding Network Intrusion Detection*; Jan. 1998; available at http://www.acri.org/vern/Ptacek-Newsham-Evasion-98.ps; last visited Mar. 19, 2003, 55 pages.

Vern Paxson; *Bro: A System for Detecting Network Intruders in Real-Time*; Computer Networks, Dec. 1999; 31 (23-24) pp. 2435-2463; also available at http://www.icir.org/vern/bro-info.html.

Mark Handley, Vern Paxson and Christian Kreibich; *Network Intrusion Detection: Evasion, Traffic Normalization, and End-to-End Protocol Semantics*; Proceedings of USENIX Security Symposium 2001, available at Http://www.icir.org/vern/papers/-norm-usenix-sec-01.html/index.html; last visited Mar. 19, 2003; 17 pages.

* cited by examiner

*Primary Examiner*—Vivek Srivastava
*Assistant Examiner*—Azizul Choudhury
(74) *Attorney, Agent, or Firm*—BainwoodHuang

(57) ABSTRACT

Systems detect maliciously formed TCP/IP retransmit packets attempting to pass through an intrusion detection system (IDS) and prevent them from reaching their destination by forcing early flow termination. As each packet arrives in the IDS, the TTL field is monotonically decreased by setting it to the smallest TTL received from the packet flow. Any packet flow that attempts to confuse the sensor with a low TTL will be starved off and will never reach the destination host. Each flow may be periodically reset to a high value or to the current packet value to allow flow recovery. In another embodiment, the TTL decrease mechanism may operate on a contingent basis, determined by the presence or absence of the flow identifier on a pre-determined list of flows that should never be restricted.

21 Claims, 5 Drawing Sheets

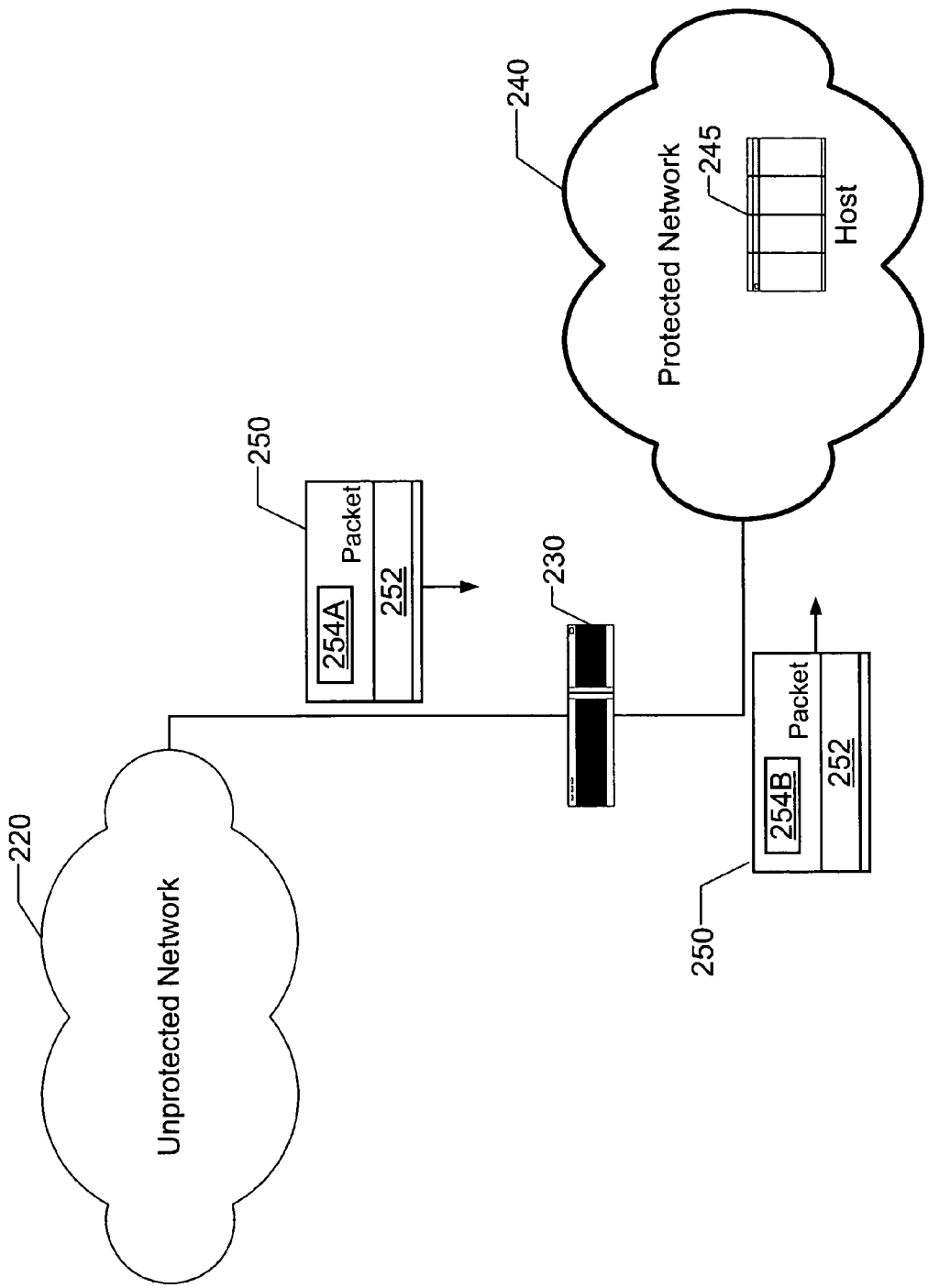

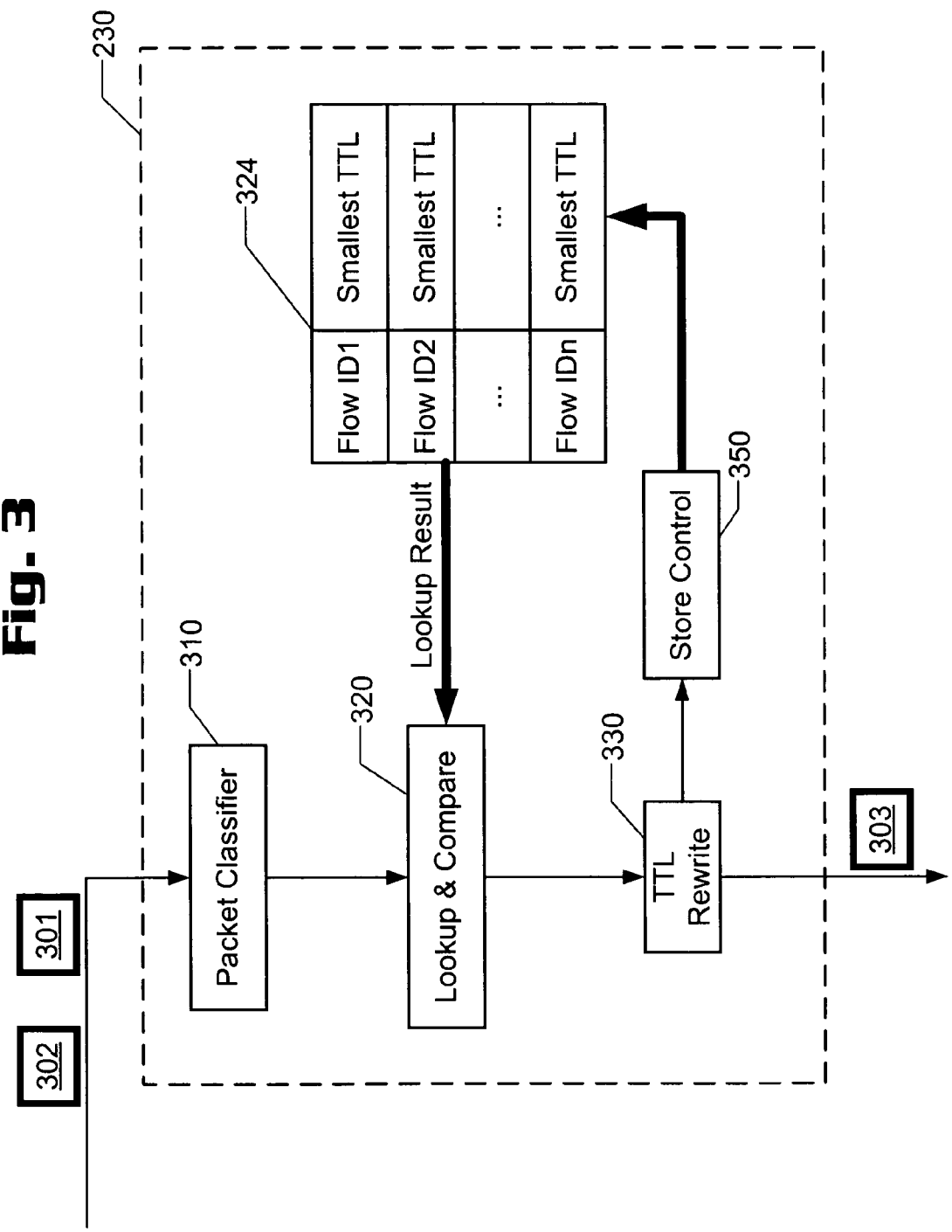

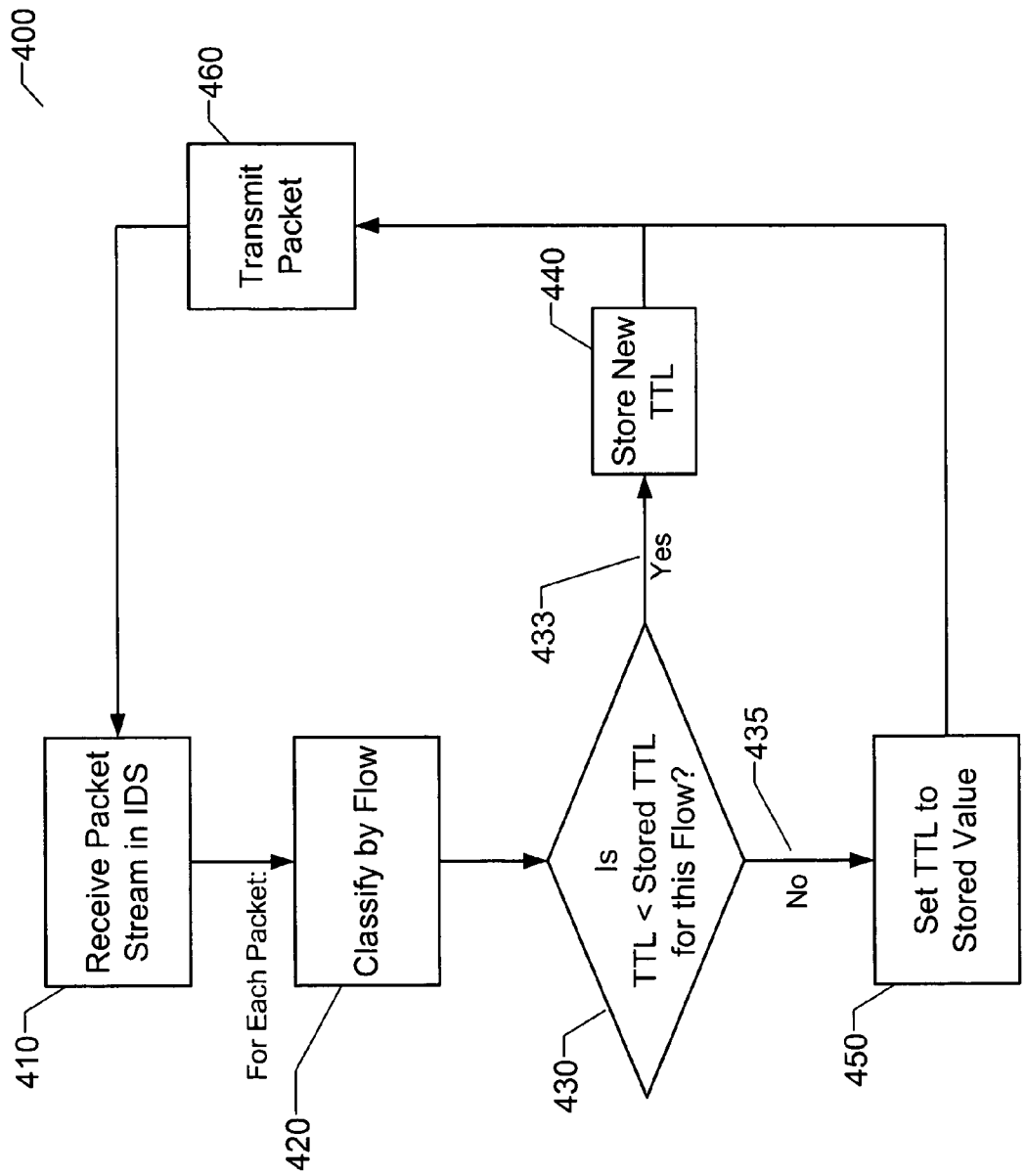

USE OF PER-FLOW MONOTONICALLY DECREASING TTLS TO PREVENT IDS CIRCUMVENTION

CROSS-REFERENCE TO RELATED APPLICATIONS

The present application is related to the co-pending application entitled "USE OF PACKET HASHES TO PREVENT TCP RETRANSMIT OVERWRITE ATTACKS," application Ser. No. 10/820,327, filed on even date herewith, the disclosure of which is hereby incorporated herein by reference in its entirety.

BACKGROUND

A typical computer networking system may include, among other things, an intrusion detection system (IDS) configured to monitor network traffic and to block attempted attacks on or intrusions into the protected network space. Such intrusion detection systems may coexist with various types of firewalls, packet monitors, and other devices and typically include intrusion sensing functions (e.g., advanced routers). These systems include both active and passive devices and may be generally referred to as "sensors." Passive network sensors, for example, may utilize "promiscuous mode" access: a promiscuous network monitoring device, commonly referred to as a sniffer, examines copies of all of the packets directly from the network media, regardless of packet destination. Active sensors may read the packet off the network, store it until it is processed, and write it back to the network, possibly with modification.

One way to circumvent a conventional IDS is to use the time to live (TTL) field of the conventional Internet Protocol (IP) packet to confuse (or "de-synchronize") the sensor. This is a desirable goal for the attacker because a de-synchronized IDS typically "fails open," i.e., it stops applying its policy and filtering rules and allows all traffic to pass through. Ill-intentioned people have been known to send a TCP/IP packet with a TTL set low enough (e.g., TTL=1) so that the packet reaches the sensor but does not make it to the destination host. Since this packet is only seen by the sensor and not the end host, its only purpose is to confuse the IDS with a data stream that the end host will never process. On retransmission, however, the attacker sends a packet with a higher TTL (such as TTL=50 or 55), but now containing malicious data in the payload field. "Malicious data" includes a virus or other software code designed to subvert or disable the target host. The "retransmitted" TCP packet passes through the IDS sensor because the sensor assumes that any packet received with a previously seen TCP sequence number is a retransmit packet and does not try to re-analyze the data payload. Re-analysis of retransmit packets is generally considered too difficult because IDS sensors do not store the state they were in when the packet was first received: that kind of packet inspection is very costly in terms of processor resources and throughput/latency impacts. Typically, packet state is only maintained for the original packet, and even that state is limited to a few bytes of data.

The malicious packet will thus be sent on unimpeded to the destination host in accordance with conventional IP routing protocols. Furthermore, there are other ways of de-synchronizing an IDS that allow a maliciously-formed retransmit packet to bypass IDS protection. This type of attack is sometimes called an "overwrite" attack because the attacker is attempting to insert code by overwriting the data payload in a retransmit packet. The end host will accept the bad packet because the original packet (the packet that timed out) will not have been seen and acknowledged by the end host. Once the bad payload arrives at the end host, it may then initiate or trigger an attack on the end host or on other hosts in the network.

By design, the only difference between the original packet and its corresponding retransmit packet are the "mutable" fields within the IP packet header, such the TTL field, and the mutable fields within the TCP header, such as the Flags and Acknowledgement Number fields. The TCP packet (encapsulated within the IP data payload field) is supposed to be unchanged from the original TCP/IP transmission.

Intrusion detection systems and the various types of insertion, evasion, and overwrite attacks are generally described in (for example) T. H. Ptacek and T. N. Newsham, Insertion, Evasion, and Denial Of Service: Eluding Network Intrusion Detection, Secure Networks, Inc. (January 1998), http://www.acri.org/vern/Ptacek-Newsham-Evasion-98.ps (visited on Mar. 19, 2003); V. Paxson, Bro: A System for Detecting Network Intruders in Real-Time, Computer Networks, 31 (23-24) pp. 2435-2463 (December 1999); and M. Handley, V. Paxson, and C. Kreibich, Network Intrusion Detection: Evasion, Traffic Normalization, and End-To-End Protocol Semantics, Proc. USENIX Security Symposium 2001, http://www.icir.org/vern/papers/-norm-usenix-sec-01-html/index.html (visited on Mar. 19, 2003), incorporated herein by reference in their entireties.

SUMMARY

What is needed is a method of preventing maliciously formed retransmit packets from circumventing an intrusion detection system by employing an artificially low time to live (TTL) value (or other de-synchronization of IDS function) to enable a packet retransmit.

Embodiments of the invention are therefore directed to systems that prevent a maliciously formed retransmit packet from reaching its destination by forcing early flow termination when a very low TTL is received. In one embodiment, as each TCP/IP packet arrives in the IDS, the TTL field is monotonically decreased by setting it to the lowest TTL received from the packet flow. The packet flow, as that term is understood in the art, is conventionally understood to refer to the stream of TCP/IP packets coming from a particular source addresses (SA) and source port and going to a particular destination address (DA) and destination port. Since it is within the IP specification to decrement the TTL field by "one or more" on receipt, this modification of the packet header will not break further packet processing within the network. Thus, any packet flow that attempts to confuse the sensor with an artificially low TTL value will be starved off and will never reach the destination host.

In some embodiments, the period of time over which the smallest received packet TTL is retained is varied. This time interval is adjusted to discard old "smallest" TTLs after a predefined period of time has expired to allow the TTL setting mechanism to reset itself, affording otherwise valid flows the opportunity to re-establish themselves after a routing flap or other network disturbance causes a decrease in the TTL value. Alternatively, the system may periodically reset the stored smallest TTL value to a maximum value (e.g., TTL=255). In either alternate embodiment, each flow is periodically reset to allow packets through to afford a recovery opportunity for valid flows that were improperly (or prematurely) choked off.

In still another embodiment, the TTL decrease mechanism operates on a contingent basis, determined by the presence or absence of the flow identifier (or label) on a pre-determined list of flows that should never be restricted. This "unrestricted flow" list enables the selective designation of flows that are exempt from TTL reduction, thus ensuring that a routing problem or flap would never cause an interruption in service on those flows.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a high-level block diagram of an intrusion detection sensor (IDS) in a network configured according to one embodiment of the present invention.

FIG. 3 is a high-level block diagram of IDS functionality, according to one embodiment of the present invention.

FIG. 4 is a flowchart of the IDS processing employed by the sensor of FIG. 3, according to one embodiment of the present invention.

DETAILED DESCRIPTION

Embodiments of the present invention are directed to techniques and systems for blocking the transmission of maliciously formed packets that attempt to penetrate a protected network by subverting or confusing the time to live (TTL) mechanism employed in TCP/IP packet networking.

Figure 1A:
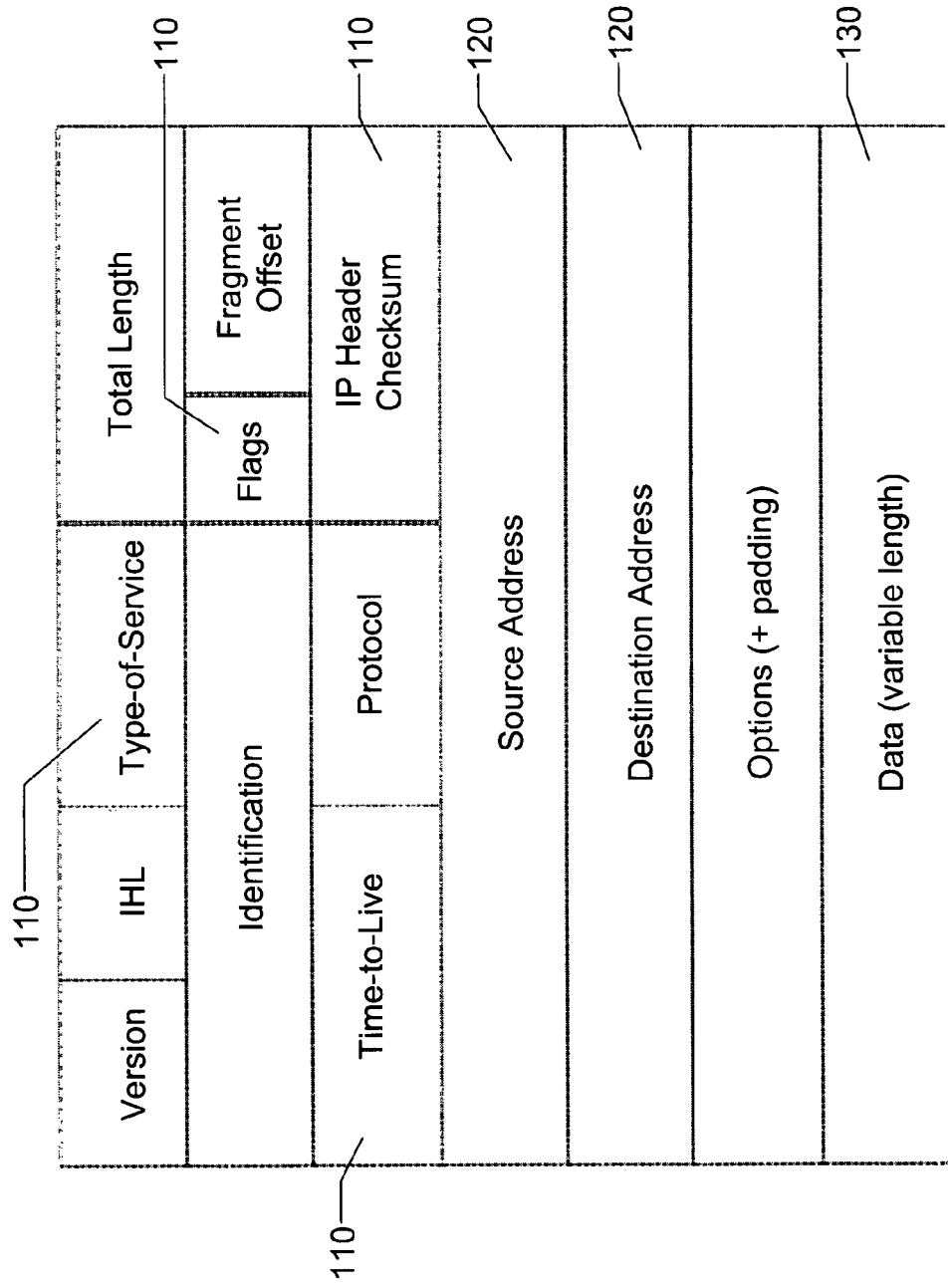
FIG. 1A is a high-level schematic representation of the prior art IP version 4 packet format.

FIG. 1A is a schematic representation of the well-known Internet Protocol version 4 (IPv4) packet format, illustrating the presence and location of the TTL field and other mutable and non-mutable fields. The mutable fields 110 consist of most of the IP header fields, for example TTL, TOS (also known as Differentiated Services Codepoint or DSCP), and Flags. The non-mutable fields 120 consist of at least the flow identifying fields (SA, DA, etc.) and the data payload 130.

Although the invention is described by reference to the IPv4 packet format, those skilled in the art will realize that IP version 6 (IPv6) packets may also employ the inventive techniques and systems. Accordingly, the invention is not limited to any particular packet format.

Figure 1B:
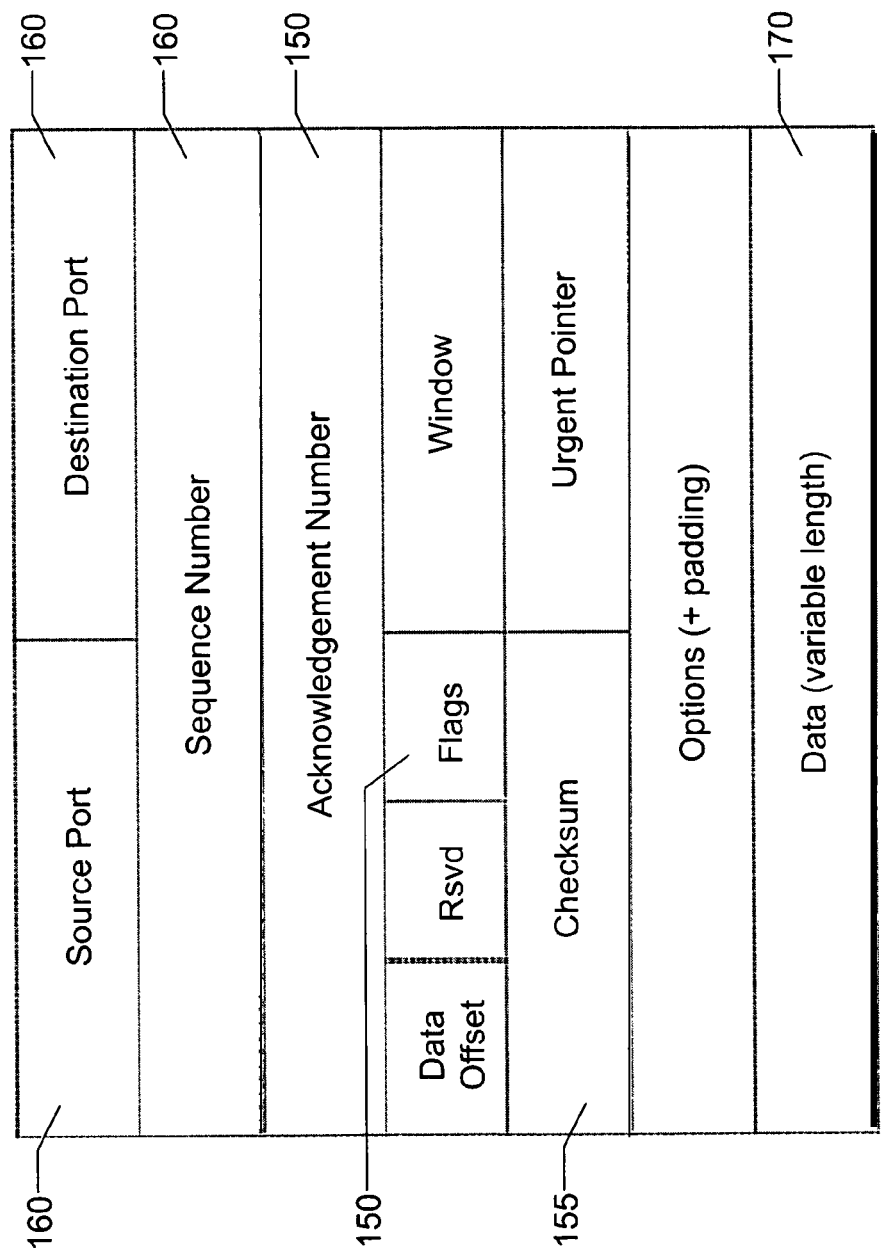
FIG. 1B is a high-level schematic representation of the prior art TCP packet format.

FIG. 1B is a schematic representation of the well-known Transmission Control Protocol (TCP) packet format, illustrating the presence and location of the Sequence Number field and other mutable and non-mutable fields. The mutable fields 150 consist of most of the TCP header fields, for example Acknowledgement Number and Flags. The non-mutable fields 160 consist of at least the flow identifying fields (Source Port, Destination Port), the Sequence Number, and the data payload 170.

FIG. 2 is a high-level block diagram of a computer network including an unprotected network 220 (such as, but not limited to, the public Internet), an IDS sensor 230, and a destination (protected) network 240 including the destination host 245. Protected network 240 may be, for example, a private LAN or MAN or a campus-wide network serving a large company or university.

In one exemplary embodiment, IDS sensor 230 blocks passage of malicious data payloads 252 by monotonically decreasing the TTL field 254 to the lowest received TTL value in that packet's flow. FIG. 2 graphically illustrates the stream of TCP/IP packets, such as those discussed with reference to FIG. 1, entering IDS sensor 230 with representative packet 250. Packet 250 has within it a TTL value 254A. After application of an embodiment of the present invention, packet 250 exits IDS sensor 230 with its TTL (254B) set to the smallest received TTL value in its flow.

Although IDS sensor 230 is described as a physical device located in-line (in the packet stream) on a network, those skilled in the art will realize that the presently-described IDS sensor functionality may be implemented in hardware and/or software located in any device on a network. Furthermore, IDS functions may be provided by other devices and/or device functionality such as firewalls, load balancers, advanced routers (which implement firewall and intrusion detection functions within their software), and the like. Accordingly, although the term "IDS sensor" is used throughout this Specification, the present invention should be understood to apply to any implementation of the inventive intrusion detection function in a network, whether in hardware or software or in a stand-alone or integrated device.

FIG. 3 illustrates a high-level block diagram of the interior processing of an IDS sensor (or functionality) 230 in accordance with the illustration of FIG. 2, i.e., one that performs TTL checking of all incoming packets 301, 302 within a particular flow and continuously sets the TTL to the smallest TTL value received from that flow. Sensor 230 first classifies each received packet 301, 302 into a flow using flow classifier 310. Original packets 301 are distinguished for ease of reference from retransmit packets 302. Next, in lookup & compare unit 320, system 230 compares the received packet TTL to a stored record (provided through a lookup into flow-specific TTL store 324) of the smallest TTL so far received from that flow to determine if the new TTL is smaller. For illustrative simplicity, the lookup and comparison functions are here shown as a single unit. One of ordinary skill in the art will readily appreciate that such functions can be implemented in many ways using one or more devices or software functions. Accordingly, the present invention is to be understood as not limited to a particular implementation of these functions.

Next, TTL rewrite unit 330 sets the packet TTL to the smaller of the received packet's TTL and the stored record of the smallest TTL so far received in the current flow. If necessary, the new, smallest TTL value is stored in the flow-specific TTL store 324 by store control unit 350, overwriting the prior smallest TTL value.

Thus, on a flow-by-flow basis, sensor 230 identifies and saves the smallest packet TTL value received by constantly comparing each new packet's TTL value to the smallest value received so far. If the new value is less than the stored value, the new value is stored, replacing the old. The smallest TTL value received for each flow is then used to set the TTL on each outgoing packet 303. In particular, whenever a new, original packet 301 or retransmit packet 302 is received, its TTL value will be set to the smallest TTL value received from its flow prior to the packet transmission (or forwarding) from the IDS. In the case of a TTL attack, as described above, the smallest TTL value seen in the attacking flow will be very close to zero. Setting the (malicious) retransmit packet 302 TTL to the same, near-zero value will consequently prevent the bad packet from reaching the destination host, thus blocking the attack.

In an alternate embodiment, the system may be configured to expire or to "age out" the stored smallest TTL values for each flow, i.e., to discard smallest TTLs stored more than a predefined period of time ago. In one embodiment, an epoch or timestamp is associated with the smallest received TTL value stored for each flow in TTL store 324. Prior to testing a newly received TTL value to see if it is less than the stored smallest received TTL value (using lookup & compare unit 320), such an embodiment of the invention first tests the epoch of the stored value. If the smallest value was stored more than a predefined period of time ago (for example, two minutes), then the new TTL value overwrites the old stored value, regardless of whether it is less than the old stored value. Thus, only the most recently received packet TTL will be considered the smallest TTL for comparison purposes. This embodiment allows artificially low TTLs, such as those caused by an upstream routing flap, for example, to be flushed from the smallest received TTL store 324, preventing false alarms (due to legitimately low packet TTLs) from choking off an otherwise good flow.

In a further alternate embodiment, the current smallest TTL value for each flow (or for a selected flow) is periodically reset to a predefined maximum value, such as 75. This allows for recovery or re-establishment of any flow that had been choked off.

FIG. 4 illustrates a flowchart corresponding to an embodiment of the IDS sensor depicted in FIG. 3, explaining in further detail the steps whereby embodiments of the invention examines packet TTL values. A packet stream consisting of original packets and corresponding retransmit packets arrives at the sensor, 410, from a network. As noted above, each original packet and its corresponding retransmit packet belong to a packet flow, and every packet has a TTL value associated with it and included in its IP header.

For each packet, embodiments of the invention first classify each packet according to its flow in step 420. Then, process 400 reads the TTL value of each packet and tests 430 the new TTL against the stored smallest (least or lowest) TTL value for its flow. If the new packet TTL value is less than the stored smallest TTL value (represented by branch 433), the new TTL replaces the stored TTL in step 440. The packet is then transmitted 460 out of the sensor and process 400 loops to await receipt of the next packet at step 410.

If the packet TTL is not less than the stored value (i.e., it is greater than or equal to the smallest packet TTL value so far received) for its corresponding flow, process 400 follows branch 435. The packet TTL is set (by rewriting the appropriate IP header field) to the stored smallest TTL value in step 450 prior to packet transmission 460. In other words, the smallest TTL value received on the flow is copied from the flow-specific TTL store and used to overwrite the TTL value of the packet prior to packet transmission/forwarding. In this way, the TTL of each packet is limited to (or held at) the lowest TTL value of any packet in its flow. As discussed above, this has the effect of choking off the flow (by causing the TTL value to drop toward zero, thus preventing further transmission of the packet) when a packet with an extremely low TTL arrives at the IDS sensor.

Although a serial sequence is illustrated for clarity, one of ordinary skill in the art will readily appreciate that a pipelined or parallel operation is also possible (and in fact desirable) since the packets arrive rapidly and in a continuous stream. Accordingly, the present invention is not limited to a serial sequence of steps.

Alternate Embodiments

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While this invention has been particularly shown and described with references to embodiments thereof, it will be understood by those skilled in the art that various changes in form and details may be made therein without departing from the spirit and scope of the invention as defined by the appended claims.

We claim:

1. A method of blocking attacks on a protected computer network, comprising:
   receiving, by processing circuitry, a plurality of packets from a network, each said packet having a packet time to live (TTL) value and belonging to a corresponding packet flow;
   storing, by the processing circuitry, the smallest packet TTL value received from each said corresponding packet flow; and
   prior to transmitting each said packet, setting, by the processing circuitry, said packet TTL value to said smallest packet TTL value received for said corresponding packet flow;
   wherein storing the smallest packet TTL value received from each said corresponding packet flow includes, for each said packet:
      if that packet is the first packet received from said corresponding packet flow, then storing the packet TTL value of that packet as said smallest packet TTL value received from said corresponding packet flow;
      if that packet is not the first packet received from said corresponding packet flow and the packet TTL value of that packet is less than the stored smallest packet TTL value received from said corresponding packet flow, then storing the packet TTL value of that packet as said smallest packet TTL value received from said corresponding packet flow; and
      if that packet is not the first packet received from said corresponding packet flow and the packet TTL value of that packet is greater than the stored smallest packet TTL value received from said corresponding packet flow, then refraining from storing the packet TTL value of that packet as said smallest packet TTL value received from said corresponding packet flow.

2. The method of claim 1, wherein said storing the smallest packet TTL value further comprises:
   associating an epoch with said stored smallest packet TTL value; and
   if said epoch is greater than a predefined value, discarding said stored smallest packet TTL value.

3. The method of claim 1, further comprising periodically resetting said stored smallest packet TTL value to a maximum value.

4. The method of claim 1, wherein said setting said packet TTL value comprises:

determining if said corresponding packet flow is on an unrestricted list;
and if said corresponding packet flow is on said unrestricted list, setting said packet TTL value to a maximum value.

5. The method of claim 1, wherein said setting said packet TTL value comprises:
determining if said corresponding packet flow is on an unrestricted list;
and if said corresponding packet flow is on said unrestricted list, leaving said packet TTL value unchanged.

6. The method of claim 1, wherein:
for each said packet, said packet TTL value is a value stored within the header of that packet; and
the method further comprises transmitting each said packet across the protected computer network, said packet being configured to expire after a number of hops equal to said smallest packet TTL value received for said corresponding packet flow.

7. An apparatus for blocking attacks on a protected computer network, comprising:
processing circuitry for receiving a plurality of packets from a network, each said packet having a packet time to live (TTL) value and belonging to a corresponding packet flow;
processing circuitry for storing the smallest packet TTL value received from each said corresponding packet flow; and
processing circuitry for setting said packet TTL value to said smallest packet TTL value received for said corresponding packet flow prior to transmitting each said packet;
wherein said processing circuitry for storing the smallest packet TTL value received from each said corresponding packet flow includes means for, for each said packet:
if that packet is the first packet received from said corresponding packet flow, then storing the packet TTL value of that packet as said smallest packet TTL value received from said corresponding packet flow;
if that packet is not the first packet received from said corresponding packet flow and the packet TTL value of that packet is less than the stored smallest packet TTL value received from said corresponding packet flow, then storing the packet TTL value of that packet as said smallest packet TTL value received from said corresponding packet flow; and
if that packet is not the first packet received from said corresponding packet flow and the packet TTL value of that packet is greater than the stored smallest packet TTL value received from said corresponding packet flow, then refraining from storing the packet TTL value of that packet as said smallest packet TTL value received from said corresponding packet flow.

8. The apparatus of claim 7, wherein said processing circuitry for storing the smallest packet TTL value further comprises:
means for associating an epoch with said stored smallest packet TTL value; and
means for discarding said stored smallest packet TTL value if said epoch is greater than a predefined value.

9. The apparatus of claim 7, further comprising means for periodically resetting said stored smallest packet TTL value to a maximum value.

10. The apparatus of claim 7, wherein said processing circuitry for setting said packet TTL value comprises:
means for determining if said corresponding packet flow is on an unrestricted list; and means for setting said packet TTL value to a maximum value if said corresponding packet flow is on said unrestricted list.

11. The apparatus of claim 7, wherein said processing circuitry for setting said packet TTL value comprises:
means for determining if said corresponding packet flow is on an unrestricted list; and
means for leaving said packet TTL value unchanged if said corresponding packet flow is on said unrestricted list.

12. An apparatus for blocking attacks on a protected computer network, comprising:
a packet classifier configured to receive a plurality of packets from a network, each said packet having a packet time to live (TTL) value and belonging to a corresponding packet flow;
a memory configured to store the smallest packet TTL value received from each said corresponding packet flow;
a TTL rewrite unit configured to set said packet TTL value to said smallest packet TTL value received for said corresponding packet flow prior to transmitting each said packet; and
a controller, the controller being configured to, for each said packet:
if that packet is the first packet received from said corresponding packet flow, then store in memory the packet TTL value of that packet as said smallest packet TTL value received from said corresponding packet flow;
if that packet is not the first packet received from said corresponding packet flow and the packet TTL value of that packet is less than the stored smallest packet TTL value received from said corresponding packet flow, then store in memory the packet TTL value of that packet as said smallest packet TTL value received from said corresponding packet flow; and
if that packet is not the first packet received from said corresponding packet flow and the packet TTL value of that packet is greater than the stored smallest packet TTL value received from said corresponding packet flow, then refrain from storing in memory the packet TTL value of that packet as said smallest packet TTL value received from said corresponding packet flow.

13. The apparatus of claim 12, wherein said memory comprises:
first control means for associating an epoch with said stored smallest packet TTL value; and
second control means for discarding said stored smallest packet TTL value if said epoch is greater than a predefined value.

14. The apparatus of claim 12, further comprising control means for periodically resetting said stored smallest packet TTL value to a maximum value.

15. The apparatus of claim 12, wherein said TTL rewrite unit comprises:
first control means for determining if said corresponding packet flow is on an unrestricted list; and
second control means for setting said packet TTL value to a maximum value if said corresponding packet flow is on said unrestricted list.

16. The apparatus of claim 12, wherein said TTL rewrite unit comprises:
first control means for determining if said corresponding packet flow is on an unrestricted list; and
second control means for leaving said packet TTL value unchanged if said corresponding packet flow is on said unrestricted list.

17. A computer program product comprising a non-transitory computer-readable medium having instructions stored thereon that, when performed by a computer, cause the computer to perform the following operations:

receiving a plurality of packets from a network, each said packet having a packet time to live (TTL) value and belonging to a corresponding packet flow;

storing the smallest packet TTL value received from each said corresponding packet flow; and prior to transmitting each said packet, setting said packet TTL value to said smallest packet TTL value received for said corresponding packet flow;

wherein said instructions for storing the smallest packet TTL value received from each said corresponding packet flow comprise instructions that, when performed by the computer, cause the computer to perform the following operations:

if that packet is the first packet received from said corresponding packet flow, then storing the packet TTL value of that packet as said smallest packet TTL value received from said corresponding packet flow;

if that packet is not the first packet received from said corresponding packet flow and the packet TTL value of that packet is less than the stored smallest packet TTL value received from said corresponding packet flow, then storing the packet TTL value of that packet as said smallest packet TTL value received from said corresponding packet flow; and if that packet is not the first packet received from said corresponding packet flow and the packet TTL value of that packet is greater than the stored smallest packet TTL value received from said corresponding packet flow, then refraining from storing the packet TTL value of that packet as said smallest packet TTL value received from said corresponding packet flow.

18. The computer program product of claim 17, wherein said instructions for storing the smallest packet TTL value further comprise instructions that, when performed by the computer, cause the computer to perform the following operations:

associating an epoch with said stored smallest packet TTL value; and if said epoch is greater than a predefined value, discarding said stored smallest packet TTL value.

19. The computer program product of claim 17, further comprising instructions that, when performed by the computer, further cause the computer to perform the following operations:

periodically resetting said stored smallest packet TTL value to a maximum value.

20. The computer program product of claim 17, wherein said instructions for setting said packet TTL value comprise instructions that, when performed by the computer, cause the computer to perform the following operations:

determining if said corresponding packet flow is on an unrestricted list; and if said corresponding packet flow is on said unrestricted list, setting said packet TTL value to a maximum value.

21. The computer program product of claim 17, wherein said instructions for setting said packet TTL value comprise instructions that, when performed by the computer, cause the computer to perform the following operations:

determining if said corresponding packet flow is on an unrestricted list; and if said corresponding packet flow is on said unrestricted list, leaving said packet TTL value unchanged.

* * * * *